United States Patent [19]

Dzung

[11] Patent Number: 4,750,192
[45] Date of Patent: Jun. 7, 1988

[54] METHOD FOR TRANSMITTING DIGITAL DATA BY MEANS OF CONTINUOUS PHASE MODULATION

[75] Inventor: Dacfey Dzung, Würenlos, Switzerland

[73] Assignee: BBC Brown Boveri AG, Baden, Switzerland

[21] Appl. No.: 64,571

[22] Filed: Jun. 22, 1987

[30] Foreign Application Priority Data

Jun. 24, 1986 [CH] Switzerland ............... 2539/86

[51] Int. Cl.$^4$ .................................. H04L 27/12
[52] U.S. Cl. ............................ 375/67; 332/18; 375/60
[58] Field of Search .............. 375/52, 57, 59, 60, 375/67; 342/83; 332/9 R, 10, 16 R, 18

[56] References Cited

U.S. PATENT DOCUMENTS 4,404,532  9/1983  Welti ........................... 375/67
4,477,916 10/1984  Chung .......................... 375/60
4,556,869 12/1985  Thomson ....................... 332/18

OTHER PUBLICATIONS

IEEE Communications Magazine; vol. 24, No. 4, Apr. 1986, pp. 25-37, "Continuous Phase Modulation", C. E. Sundberg.
Globecom Conference Record, 1982, Miami, Nov. 29-Dec. 2, 1982, pp. 877-883, T. Aulin et al., "Synchronization Properties of Continuous Phase Modulation".
National Telecommunication Conference, New Orleans, Conference Record, Dec. 1-2, 1982, pp. 38.1-38.5.
IEEE Transactions on Communications, vol. COM-29, No. 3, Mar. 1981, pp. 196-225, T. Aulin et al., "Continuous Phase Modulation".

Primary Examiner—Benedict V. Safourek
Attorney, Agent, or Firm—Oblon, Fisher, Spivak, McClelland & Maier

[57] ABSTRACT

A method for transmitting digital data by means of continuous phase modulation (CPM), wherein the transmission signal s(t) is generated by retrieving stored digital values, which are allocated to a continuous sequence of symbols $a_i$ present at the transmitter input, from storage in a memory. In contrast to the conventional method, these stored digital values are not calculated from a predetermined frequency-base-band pulse g(t) by linear superposition but are optimized with respect to the in-band power emitted by means of an iterative method. This non-linear method leads to distinctly improved spectral characteristics of the transmission signal s(t).

4 Claims, 2 Drawing Sheets

METHOD FOR TRANSMITTING DIGITAL DATA BY MEANS OF CONTINUOUS PHASE MODULATION

BACKGROUND OF THE INVENTION

Field of the Invention

This invention relates to a method for transmitting digital data by means of continuous phase modulation, such as is known, for example, from the article by T. Aulin and C. -E. W. Sundberg, "Continuous Phase Modulation", Parts I, II, IEEE Trans. Commun., Vol. COM-29, No. 3, March 1981, pages 196–225.

Discussion of Background

In the past, continuous phase modulation (CPM=Continuous Phase Modulation) has attracted considerable notice as an efficient method for transmitting digital data. On the one hand, this is due to the fact that, because of its constant envelope curve, a CPM signal is insensitive to nonlinearities in the transmission chain.

On the other hand, due to the continuous phase change and the associated "soft" wave shapes, good spectral characteristics are achieved which are reflected in a rapid decrease in spectral power density outside the useful frequency band.

As is explained in greater detail in the article mentioned initially, the spectral characteristics of a CPM signal can be improved by first subjecting the sequence of symbols present at the input of the transmitter to a shaping process as determined by a particular frequency-baseband pulse g(t).

This results in particularly favorable results if the function g(t) extends not only to one symbol interval (full response scheme) but over several symbol intervals (partial response scheme) so that the transmitted transmission signal in one symbol interval is influenced not only by the respective symbol occurring within this interval but also by symbols which are adjacent in time.

In a digital implementation of the known method, particular digital values are permanently stored in the transmitter which take into account the influence of the frequency-baseband pulse g(t) on the shaping of the symbol sequence. For a fixed number of successive symbols present in each case at the transmitter input, corresponding associated digital values are taken from storage, combined with each other in a suitable manner and used for generating the analog phase-modulated transmission signal. Details of this digital implementation can be taken from the printed document mentioned initially.

In the known method, the function g(t) is then determined by trial. The stored digital values are determined by linear superposition from the function g(t) determined.

SUMMARY OF THE INVENTION

Accordingly, one object of this invention is to provide a novel method for transmitting digital data by means of CPM.

The present invention has the object of specifying a method in which the spectral characteristics are systematically optimized.

The above noted object is achieved by providing a method for transmitting digital data by means of continuous phase modulation of a carrier oscillation having the following characteristics:

(a) the digital data are present in the form of a continuous sequence of symbols ($a_i$) which occur at a rate of 1/T and can assume M possible discrete values;

(b) the information items are transmitted with a carrier frequency $f_c$ and a time-dependent phase $\phi(t)$ in a transmission signal s(t) having the form, $$s(t) = \cos|2\pi f_c t + \phi(t)|;$$

(c) before transmission, the symbols $a_i$ are subjected to a shaping process in accordance with the determination of a frequency-baseband pulse extending over L symbol L·T;

(d) for each possible sequence of L symbols, a plurality of digital values is permanently stored which, for generating the transmission signal s(t) are allocated to the symbol sequence present in each case at the transmission input, are retrieved from storage and are converted into an analog signal; wherein (g) only values for which the power of the transmission signal s(t) located within a fixed frequency band around the carrier frequency (fZc) is a maximum are used as stored digital values.

The core of the invention consists in no longer using for the implementation of the method stored digital values which are derived from the frequency-baseband pulse g(t) by linear superposition, but to determine the memory content directly in accordance with the determination of the criterion that the signal power located within a fixed frequency band around the carrier frequency should be a maximum and the signal power outside this band should be a minimum. As a result, the optimum wave shape of the CPM signal is generated in a non-linear manner.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

The continuous phase modulation (CPM) is a digital frequency modulation method in which the transmitted signal has a constant envelope curve.

DESCRIPTION OF THE PREFERRED EMBODIMENTS

Figure 1:
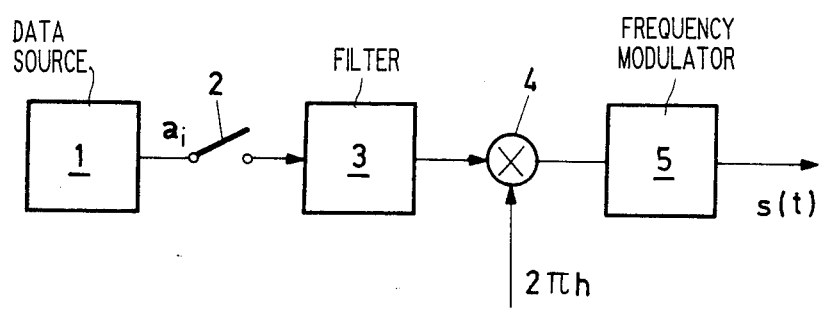
FIG. 1 is a block diagram showing the basic concept of a CPM transmitter in accordance with the prior art.

Referring now to the drawings, wherein like reference numerals designate identical or corresponding parts throughout the several views, and more particularly to FIG. 1 thereof, the basic concept of a conventional CPM transmitter is shown. A data source 1 generates a continuous sequence of symbols $a_i$ at a rate of 1/T (each symbol is allocated an interval of length T).

The symbols $a_i$ can assume M different discrete values $+1, \ldots +(M-1)$.

The symbols $a_i$ pass via a sampling device 2 to a linear filter 3 where they are shaped in accordance with the determination of a frequency-baseband pulse g(t). The output signal of the linear filter is multiplied in a multiplier 4 by the factor $2\pi h$ which contains a modulation index h. The product signal is used for driving a frequency modulator 5 at the output of which a transmission signal s(t) appears.

The transmission signal s(t) has the form $$s(t) = \cos[2\pi f_c t + \phi(t)] \quad (1)$$

Where $f_c$ is the carrier frequency $f_c$ and $\phi(t)$ is the time-dependent phase. The following equation applies for $\phi(t)$:

$$\phi(t) = \sum_{i=-\infty}^{+\infty} 2\pi h a_i \int_{-\infty}^{t} g(\tau - iT) d\tau. \quad (2)$$

The frequency-baseband pulse g(t) extends over a length L·T, that is to say over a length of L symbol intervals. It is normalized in such a way that, for the associated phase-baseband pulse $$q(t) = \int_{-\infty}^{t} g(\tau) d\tau \quad (3)$$

the relations $$q(t) = 0 \text{ for } t \leq 0 \quad (4)$$

$$q(t) = q(L \cdot T) = \frac{1}{2} \text{ for } t \geq L \cdot T$$

are satisfied. Thus, each symbol $a_i$ changes the phase by an amount $\pi h a_i$.

The aim is then to optimize the function g(t) in order to achieve good spectral characteristics for the transmission signal s(t). For this purpose, it is necessary to maintain s(t) in a baseband-type representation.

The transmission signal can be represented as $$s(t) = \text{Re}[\exp(j2\pi f_c t) \cdot v(t)] \quad (5)$$

having the complex envelope curve $$v(t) = \exp[j\phi(t)] \quad (6)$$

By combining equations (2)–(4), the following is obtained for the absolute phase at time t in the kth symbol interval $(kT \leq t \leq (k+1)T)$:

$$\phi_k(t) = \sum_{i=-\infty}^{k-L} \pi h a_i + \sum_{i=k-(L-1)}^{k} 2\pi h a_i q(t - iT). \quad (7)$$

Introducing the two M-dimensional vectors $$a_k = \begin{vmatrix} \delta_{+1,a_k} \\ \delta_{-1,a_k} \\ \delta_{+3,a_k} \\ \delta_{-3,a_k} \\ \cdot \\ \cdot \\ \cdot \end{vmatrix} \quad \delta = \text{Kronecker symbol} \quad (8)$$

and $$d(t) = \begin{vmatrix} \exp(+j2\pi h q(t)) \\ \exp(-j2\pi h q(t)) \\ \cdot \\ \cdot \\ \cdot \end{vmatrix} \quad o \leq t \leq LT \quad (9)$$

the following is obtained for the complex envelope curve v(t):

$$v(t) = \sum_k \exp(j\phi_k(t)) = \sum_k \exp\left( j \sum_{i=-(L-1)}^{k-L} \pi h a_i \right) \cdot \prod_{i=k-(L-1)}^{k} a'_i \cdot d(t - iT) \quad (10)$$

where $a_i'$ is the transposed vector $a_i$.

Finally, v(t) can be written in the form $$v(t) = \sum_{k=-\infty}^{\infty} c_k \cdot r(t - kT) \quad (11)$$

where $$c_k = \exp\left( j \sum_{i=-(L-1)}^{k-L} \pi h a_i \right)(a_k \times a_{k-1} \times \ldots \times a_{k-(L-1)}) \quad (12)$$

and $$r(t) = d(t) \times d(t+T) \times \ldots \times d(t + (L-1)T) \quad O \leq t \leq T \quad (13)$$

Equation (12) is the required baseband representation. The "x" in equations (12) and (13) designate Kronecker matrix products so that the vectors $c_k$ and r(t) have the dimension $M^L$.

The vectors $c_k$ contain a factor which describes the accumulated phase change, and a vector having a 1 at the place corresponding to the respective set of L successive symbols $a_{k-(L-1)}, \ldots, a_k$.

With this "1" component, the vector $c_k$ selects the associated component from r(t) with the corresponding superposition of phase values. Overall, therefore, the sequence of vectors $c_k$ in the representation of equation (11) describes the influence of the symbol sequence $a_i$, whereas the effect of the symbol shaping by g(t) or q(t), respectively, is contained in r(t). The vector r(t) is different from zero only in the interval from 0 to T, where it has components of the form $$r(t) = \left[ \exp\left( j \sum_{i=0}^{L-1} 2\pi h a_i q(t + iT) \right) \right] \quad (14)$$

Each of the components of r(t) is associated with one of $M^L$ possible values for a sequence of L symbols having the weight M ($a_{-(L-1)}, \ldots, a_0$). In the text following, the representation from equation (11) will be of particular significance for optimizing the spectral characteristics in accordance with the invention.

For the digital implementation of a CPM transmitter, the transmission signal s(t) can be rewritten in the following manner on the basis of equation (1):

$$s(t) = \cos(2\pi f_c t) \cdot \cos \phi(t) - \sin(2\pi f_c t) \cdot \sin \phi(t) \quad (15).$$

Taking into consideration equation (7) the following is obtained in the kth symbol interval ($kT \leq t \leq (k+1)T$) for the cos $\Phi(t)$ term from (15):

$$\cos\phi(t) = \cos \sum_{i=k-(L-1)}^{k} 2\pi h a_i q(t - iT) \cdot \cos \sum_{i=-\infty}^{k-L} \pi h a_i - \quad (16)$$
$$\sin \sum_{i=k-(L-1)}^{k} 2\pi h a_i q(t - iT) \cdot \sin \sum_{i=-\infty}^{k-L} \pi h a_i$$

An analogous expression can also be derived for the sin $\Phi(t)$ term.

Figure 2:
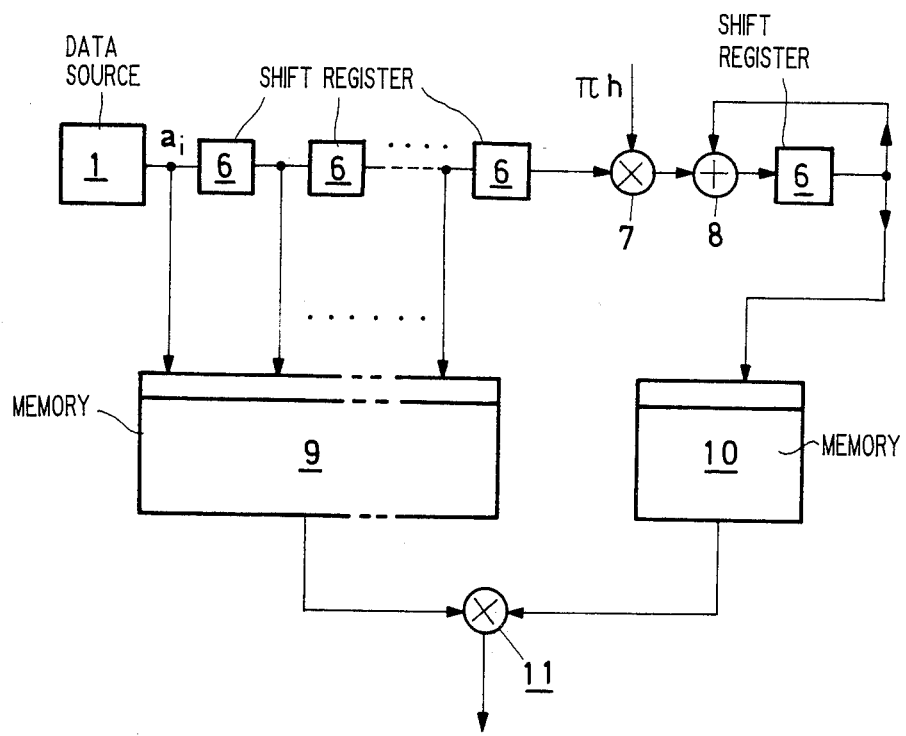
FIG. 2 is a block diagram of a section of a digitally constructed CPM transmitter, known per se, such as is used when the method according to the invention is applied.

The section of a digital CPM transmitter which generates the cos product from equation (16) is reproduced in FIG. 2. The continuous sequence of symbols $a_i$ from the data source 1 first passes through a shift register formed from L shift elements 6. Each sequence of L symbols present in the shift register addresses in a first memory 9 storage spaces which contain curve values of the function $$\cos \sum_{i=k-(L-1)}^{k} 2\pi h a_i (t - iT)$$

The second factor of the cos product from equation (16), which is $$\cos \sum_{i=-\infty}^{k-L} \pi h a_i$$

is similarly read out of a second memory 10 which is addressed by values which are generated from the symbols $a_i$ by multiplication by $\pi h$ in the multiplier 7 and addition of the preceding value in adder 8.

Finally, the cos product is formed in multiplier 11.

The block diagram of a complete CPM transmitter is reproduced in the printed document initially mentioned. ROMs (Read Only Memories) are used as memories 9 and 10, memory 9 having a capacity of $N \cdot N_q \cdot M^L$ bits if N curve values per symbol interval and $N_q$ bits per curve value are needed.

Comparing equations (16) and (14), it is found that memory 9 from FIG. 2 essentially contains just the components of vector $r(t-kT)$. This correspondence forms a basis for optimizing the spectral characteristics of the CPM system.

Let the $M^L$-dimensional baseband representation for v(t) from equation (11) be assumed. For K symbols, $$v(t) = \sum_{k=0}^{K-1} c'_k \delta(t - kT) * r(t) \quad (17)$$

is obtained, where "*" designates a convolution. The Fourier transform of this is $$V_K(f) = R'(f) \cdot \sum_{k=}^{K-1} c_k \exp(-j2\pi f k T) \quad (18)$$

With the formal definition for the spectral power density $$P_v(f) = \lim_{K \to \infty} \frac{1}{KT} E[V_K(f) \cdot V_K^*(f)] \quad (19)$$

it follows, using equation (19), that:

$$P_v(f) = \frac{1}{T} R'(f) P_c(f) R^*(f). \quad (20)$$

where R(f) is the vector of the Fourier transform of r(t), f is the frequency, E is the expected value. The following also applies:

$$P_c(f) = \sum_{n=-\infty}^{\infty} \phi_c(n) \exp(-j2\pi f n T) \quad (21)$$

where $$\phi_c(n) = E[c_k c_{k-n}^+] \quad (22)$$

In principle, for optimizing the spectral characteristics of the transmission signal s(t) a frequency-baseband pulse g(t) would have to be sought which supplies this optimum result. As already mentioned, the invention uses a different approach: using a special optimization criterion, it generates digital values to be stored in memory 9 from FIG. 2 which generates a transmission signal s(t) having the desired optimized characteristics.

The optimization problem and the optimization criterion contained therein can be formulated as follows: find an optimum pulse shaping vector r(t) of the type represented in equations (13) and (14), in such a manner that $$P_B = \int_{-B}^{B} P_v(\Delta f) d(\Delta f) \quad (23)$$

$\Delta f = f - f_c$ $2B$ = bandwidth is a maximum. $P_B$ is the power falling within a frequency band of width 2B. Of equal significance with the criterion of maximum power within a fixed frequency band is the criterion of minimum power outside this frequency band.

As can be easily seen from equation (23) in conjunction with equation (20), the optimization is effected by changing the vector r(t) but not by choosing g(t). This means that the memory content, that is to say the stored digital values for generating the transmission signal s(t) are directly optimized in the method according to the invention. Thus, the optimum CPM wave shapes are generated in a non-linear manner which, generally, can no longer be represented by a diagram from FIG. 1.

In the text which follows, it will then be specified how the optimization described can be mathematically performed. Insertion of equation (20) into equation (23) supplies the expression $$P_B = \frac{1}{T} \int_{-B}^{B} R'(f) P_c(f) R^*(f) df \quad (24)$$

With the approximation for discrete time values $$r_k = r(k \cdot \Delta T), k = 0, \ldots, N-1; \Delta T = \frac{T}{N} \quad (25)$$

(N = number of samples; $\Delta T$ = sampling interval)

the following is obtained for the Fourier transform R(f) of r(t):

$$R(f) = \sum_{k=0}^{N-1} r_k \exp(-j2\pi f k \Delta T) \cdot \Delta T \quad (26)$$

Combining equation (26) with equation (24) results in an expression of the form $$P_B = \frac{T}{N^2} \sum_{k=0}^{N-1} \sum_{m=0}^{N-1} r_k' P_{km}(B) r_m^* \quad (27)$$

where $P_{km}$ are elements of a $M^L \cdot M^L$ matrix:

$$P_{km}(B) = \int_{-B}^{B} P_c(f) \exp\left(j2\pi fT \frac{m-k}{N}\right) df \quad (28)$$

$k, m = 0, \ldots, N-1$

The function $P_B$ from (27) must now be maximized with respect to the vectors $r_k$. It can be seen from equation (14) that the $M^L$ components of r(t) are of modulus 1, that is to say $r_k$ has the form $$r_k = \begin{vmatrix} \exp(j\phi_0(k)) \\ \cdot \\ \cdot \\ \cdot \\ \exp(j\phi_{M^L-1}(k)) \end{vmatrix}, k = 0, \ldots, N-1 \quad (29)$$

Given these prerequisites, the optimization problem mentioned above can be numerically solved. For this purpose, a set of $P_{km}(B)$ values is first calculated for a predetermined band having the width 2B. Using a numerical method, $P_B$ from equation (27) is then maximized with respect to the $\Phi_i(k)$ from equation (29).

This is done, for example, by means of an iterative algorithm (steepest ascent gradient algorithm) with the iteration $$\Phi_{n+1} = \Phi_n + \Delta \cdot \frac{\partial P_B}{\partial \Phi} \quad (30)$$

where $\Delta$ is the step width and $\Phi$ is the $N \cdot M^L$-dimensional vector.

$$\Phi = \begin{vmatrix} \phi_0(0) \\ \phi_1(0) \\ \cdot \\ \cdot \\ \phi_0(1) \\ \phi_1(1) \\ \cdot \\ \cdot \\ \phi_0(N-1) \\ \phi_1(N-1) \\ \cdot \\ \cdot \end{vmatrix} \quad (31)$$

The sum of the quadratic forms from equation (27) can also be written as $$P_B = \frac{T}{N^2} \sum_u \sum_v \exp(j\phi_u) p_{uv} \exp(-j\phi_v) \quad (32)$$

where the sums with respect to u and v are extended over $NM^L$ summands and $\Phi_u$ and $\Phi_v$ represent the components of $\Phi$. The matrix $(p_{uv})$ consists of a suitable arrangement of the submatrices $(P_{km}(B))$.

After some transformations, the components of the gradient of $P_B$ from equation (32) with respect to $\Phi$ have the following shape.

$$\frac{\partial P_B}{\partial \phi_u} = -2 \frac{T}{N^2} \sum_{\substack{v=0 \\ v \neq u}}^{N \cdot M^L - 1} Jm|\exp(j(\phi_u - \phi_v) p_{uv}|$$

$u = 0, \ldots, N \cdot M^L - 1$.

Finally, starting values for $\Phi$ are needed for the iteration stated in equation (30). It is simplest to use the $\Phi_i(k)$ which result from the linear shaping with a predetermined function g(t) over equations (9) and (13). The function $P_c(f)$ for predetermined values M, L and h is also obtained in the same manner.

In principle, the matrices $(P_{km}(B))$ can be obtained by numeric integration in accordance with equation (28) from $P_c(f)$.

In further explanation, the advantages of the method according to the invention shall be demonstrated by means of an example.

A binary system (M=2) is assumed in which the symbols $a_i$ can only assume two possible values. As a comparison, a conventional linear method having a frequency-baseband pulse g(t) in the form of a raised cosine (RC) is used which extends over L=3 symbol intervals. Let the modulation index h be h=½.

Figure 3:
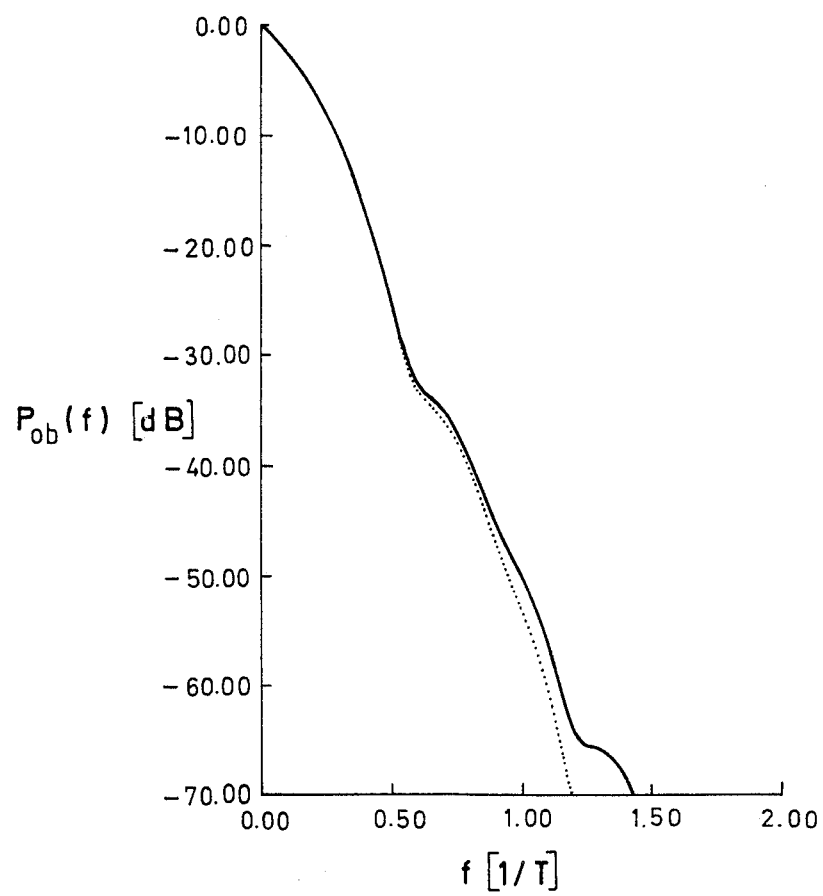
FIG. 3 is a graph showing a comparison of the spectral power distribution achieved for a conventional linear shaping process and for a non-linear shaping process in accordance with the invention.

In FIG. 3, the so-called "out-of-band" power $P_{ob}$ is compared which is defined as follows:

$$P_{ob}(f) = \int_f^{\infty} P_s(v) dv / \int_0^{\infty} P_s(v) dv \quad (34)$$

The continuous curve from FIG. 3 shows the spectral distribution of $P_{ob}(f)$ with respect to f (in units of 1/T) for the conventional linear shaping in which the stored digital values are directly calculated from the function g(t).

In contrast, the dotted curve shows the corresponding result for an optimized memory content, in the case of which an optimization has been performed with 200 iteration steps in the manner described above.

The displacement of the −70 dB point towards a lower frequency can be clearly seen which means an increase in the bit rate by a factor of 1.18.

Overall, therefore, a transmission of digital data with distinctly improved spectral characteristics is obtained by using the optimized digital values in the memories of a digital CPM system.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. Method for transmitting digital data by means of continuous phase modulation of a carrier oscillation, comprising:

presenting the digital data in the form of a continuous sequence of symbols ($a_i$) which occur at a rate of 1/T and can assume M possible discrete values;

transmitting the information items with a carrier frequency $f_c$ and a time-dependent phase $\Phi(t)$ in a transmission signal s(t) having the form $$s(t) = \cos|2\pi f_c t + \Phi(t)|;$$

before transmission, subjecting the symbols $a_i$ to a shaping process in accordance with the determination of a frequency-baseband pulse extending over L symbol intervals L·T;

permanently storing, for each possible sequence of L symbols, a plurality of digital values which, for generating the transmission signal s(t) are allocated to the symbol sequence present in each case at the transmission input, are retrieved from storage and converted into an analog signal; and using only values for which the power of the transmission signal s(t) located within a fixed frequency band around the carrier frequency (fZc) is a maximum as stored digital values.

2. Method as claimed in claim 1, comprising:

allocating a function $F_k(t)$ to the L last symbols $a_{k-L+1}, \ldots, a_k$ for each symbol interval $k(kT \leq T \leq (K+1)T)$, and using samples of the functions $\sin F_K(t)$ and $\cos F_K(t)$ as stored digital values.

3. Method as claimed in claim 2, comprising:

maximizing the quantity $$P_B = \int_{-B}^{B} P_y(\Delta f) d(\Delta f),$$

where
   $P_B$ = in-band power,
   $P_y$ = spectral power density,
   $\Delta f = f - f_c$, and
   B = half bandwidth, for determination of said stored digital values.

4. Method as claimed in claim 3, comprising:

maximizing the in-band power $P_B$ by means of an iteration method for determining the stored digital values.

* * * * *